(12) United States Patent
Zhang et al.

(10) Patent No.: US 12,222,920 B1
(45) Date of Patent: Feb. 11, 2025

(54) DATA STORE SELECTION AND CONSISTENT ROUTING USING A POINTER TABLE

(71) Applicant: Amazon Technologies, Inc., Seattle, WA (US)

(72) Inventors: Tao Zhang, Issaquah, WA (US); Sneha Hulivan Girisha, Bellevue, WA (US); Christopher Yue Ng, Rochester, NY (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 17/932,256

(22) Filed: Sep. 14, 2022

(51) Int. Cl.
*G06F 16/22* (2019.01)
*G06F 16/23* (2019.01)

(52) U.S. Cl.
CPC ........ *G06F 16/2282* (2019.01); *G06F 16/235* (2019.01)

(58) Field of Classification Search
CPC .. G06F 16/22; G06F 16/2228; G06F 16/2282; G06F 16/235
See application file for complete search history.

(56) References Cited

U.S. PATENT DOCUMENTS

| | | | | |
|---|---|---|---|---|
| 8,775,759 | B2 * | 7/2014 | Tofano | G06F 3/0608 711/165 |
| 11,747,998 | B1 * | 9/2023 | Indupuru | G06F 3/0655 711/164 |
| 2004/0078450 | A1 * | 4/2004 | Chen | H04L 67/63 709/240 |
| 2005/0223022 | A1 * | 10/2005 | Weissman | G06F 16/2264 707/999.102 |
| 2007/0124276 | A1 * | 5/2007 | Weissman | G06F 16/24575 |
| 2008/0082540 | A1 * | 4/2008 | Weissman | G06F 16/176 707/999.009 |
| 2010/0306365 | A1 | 12/2010 | Gale et al. | |
| 2014/0195622 | A1 | 7/2014 | Cullen | |
| 2018/0225344 | A1 * | 8/2018 | Fang | G06F 21/62 |
| 2018/0357298 | A1 * | 12/2018 | Andrei | G06F 16/2282 |
| 2019/0042405 | A1 * | 2/2019 | Boyle | G06F 12/0246 |
| 2020/0379970 | A1 * | 12/2020 | Vasilevskiy | G06F 16/2291 |
| 2022/0027337 | A1 * | 1/2022 | Haberkorn | G06F 16/1858 |
| 2022/0261415 | A1 * | 8/2022 | Shao | G06F 16/2282 |
| 2023/0065293 | A1 * | 3/2023 | Chen | G06F 16/2228 |
| 2023/0336547 | A1 * | 10/2023 | Damour | H04L 63/0876 |

* cited by examiner

*Primary Examiner* — James E Richardson
(74) *Attorney, Agent, or Firm* — Robert C. Kowert; Kowert, Hood, Munyon, Rankin & Goetzel, P.C.

(57) ABSTRACT

A subscription storage service of a provider network may be used to select a particular datastore to store a topic subscription record for an IoT device (e.g., after the IoT device subscribes to an MQTT topic). The service may select the particular datastore based on the type of the subscription (e.g., non-wildcard vs. wildcard subscription) and one or more criteria associated with the topic (e.g., subscribe operation TPS for the topic). This may allow the service to store wildcard subscriptions to a different structure and/or datastore (e.g., a "trie" structure of an in-memory data store), while offloading the storage of non-wildcard subscriptions to another type of datastore (e.g., a key-value store) that has lower performance and/or operational cost to store data.

20 Claims, 7 Drawing Sheets

```
Subscription:
    PartitionKey:                              ⎯ 202
        type: String
        value: "AccountId_SessionId"
    SortKey:
        type: String
        value: "TopicFilter"
    TTLAttribute:
        value: "TTL"
    OtherAttributes:
        * AccountID (String)
        * VersionNumber (Number)
        * CreateDate (Number)
        * DataStore (Number)
        * CreateDate (Number)
        * LastModifiedDate (Number)
```

FIG. 2A

```
TopicFilter:
    PartitionKey:                              ⎯ 204
        type: String
        value: "AccountId_TopicFilter"
    SortKey:
        type: String
        value: "SessionId"
    TTLAttribute:
        value: "TTL"
    OtherAttributes:
        * AccountId (String)
        * ActiveSessionId (String)
        * SessionVersionNumber (Number)
        * SubscriptionVersionNumber (Number)
        * SessionAttributes (Binary)
        * SubscriptionAttributes (Binary)
        * CreateDate (Number)
        * LastModifiedDate (Number)
```

FIG. 2B

```
                                    ┌─ 206
Session:
    PartitionKey:
        type: String
        value: "AccountId_SessionId"
    SortKey:
        None
    TTLAttribute:
        value: "TTL"
    OtherAttributes:
        * AccountId (String)
        * VersionNumber (Number)
        * SessionAttributes (Binary)
        * CreateDate (Number)
        * LastModifiedDate (Number)
```

*FIG. 2C*

DATA STORE SELECTION AND CONSISTENT ROUTING USING A POINTER TABLE

BACKGROUND

The Internet of Things (IoT) is a phrase given for the interconnection of computing devices scattered around the globe within the existing internet infrastructure. Clients (e.g., customers) of a remote service provider may leverage the internet-based connectivity of IoT devices (also referred to herein as edge devices) by using a service offered by the service provider. For example, temperature sensors at a client site may collect temperature values for different equipment and transmit them to the service provider for analysis, such as determining whether a machine needs servicing.

IoT devices often use a publish-subscribe protocol in order to communicate with a service provider network (e.g., message queue telemetry transport (MQTT)). When an IoT device subscribes to a topic, it will receive sandy messages that are published to the topic. The service provider may keep track of the different topics that each device is subscribed to. An IoT device may subscribe to a concrete (non-wildcard) topic (e.g., /a/TopicX) and another device may subscribe to a wildcard topic (e.g., /a/#). A subscription database may keep track of all of the subscriptions for each IoT device, in order to send published messages to the correct devices. It may be much more efficient to store subscription information for wildcard topics in a trie structure. Therefore, a service provider may store all of the subscription information (e.g., for concrete topics and wildcard topics) in a trie structure of an in-memory data store. However, maintaining such a large number of subscriptions in an in-memory data store may require a large number of resources (e.g., compute and storage resources/devices), which can lead to high operational burden and difficulty in scaling to support a large number of IoT devices.

BRIEF DESCRIPTION OF THE DRAWINGS

FIG. 2A illustrates an example of a pointer table used for data store selection and routing, according to some embodiments.

FIG. 2B illustrates an example of a subscription table, according to some embodiments.

FIG. 2C illustrates an example of a metadata table, according to some embodiments.

Figure 1:
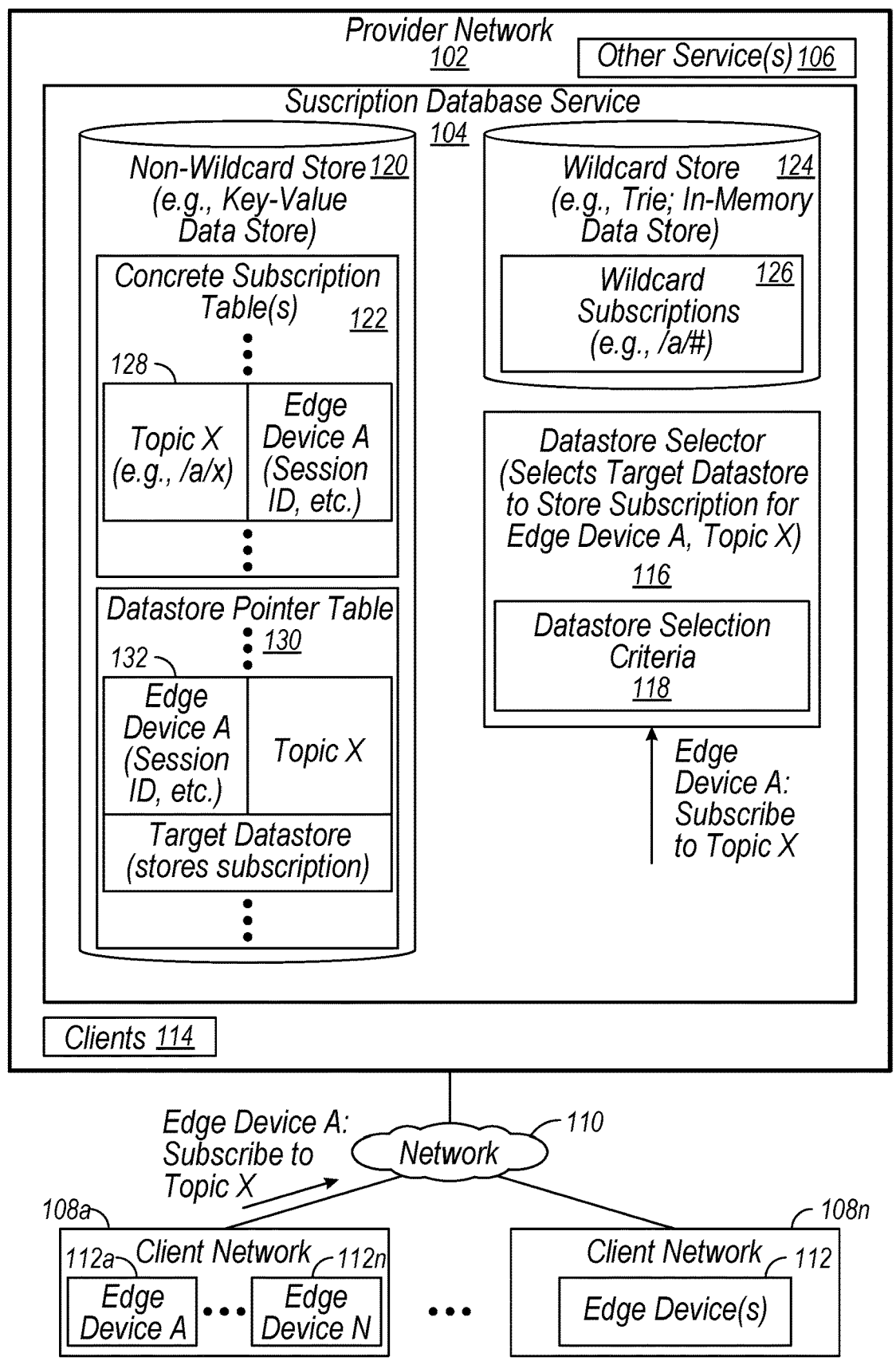
FIG. 1 is a logical block diagram illustrating a system for data store selection and routing using a pointer table, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement data store selection and routing using a pointer table, according to some embodiments. In embodiments, data store selection and routing using a pointer table may allow for storage of a very large amount of data while consuming fewer storage and computing resources, compared to traditional techniques.

In various embodiments, a service provider may receive a request to store subscription information for a subscription to a topic for an edge device. The service may then determine whether an entry for the subscription to the topic for the edge device exists in a datastore pointer table. If the entry exists, then the service may determine, based on the type of subscription (e.g., concrete or wildcard) and one or more criteria, that a particular datastore, from among multiple available datastores, is to be used as a target datastore to store the subscription information that indicates the subscription to the topic for the edge device. The service may then add a new entry to the datastore pointer table that indicates the particular datastore as the target datastore to store the subscription information to the topic for the edge device. The service may then store the subscription information to the particular datastore. As described below, a same or similar algorithm may be used to process a request to store data, where there are multiple different datastores available to store data.

In embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 6 and described below.

This specification begins with a description of a system for data store selection and routing using a pointer table. A number of different methods and techniques for data store selection and routing using a pointer table are described, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for data store selection and routing using a pointer table, according to some embodiments. [note to inventors: the reference numerals on the figures will be updated to match the numerals below in the revised draft]

As shown, a provider network 102 includes a subscription storage service 104 that implements data store selection and routing using a pointer table. In the example embodiment, the provider network 102 may include any number of other services 106. For example, a service 106 may implement data storage services or compute services that may be used by the subscription storage service to perform any of the functionality described herein. In some embodiments, a service 106 may execute a provider network-owned or a client-owned application that receives data from client edge devices and/or sends data to client edge devices.

In various embodiments, the subscription storage service 104 may perform any number of tasks/functionality to manage subscriptions for any number of edge devices for any of the clients of the IoT service (e.g., subscriptions for receiving messages for a topic according to a publish-subscribe protocol such as MQTT). In various embodiments, any described functionality/tasks that may be performed by the subscription storage service may instead be implemented, at least in part, by one or more of the other services 106 (e.g., storing information for registered edge devices, authentication and/or provisioning edge devices).

In the depicted embodiment, any number of clients of the subscription storage service 104 may use the subscription storage service 104 of the provider network 102 via communication between the subscription storage service 104 and a remote client network 108 of a client of the subscription storage service 104 (e.g., via a wide area network 110, such as the internet). For example, a client may own/manage the client network 108a, which may include any number of edge devices 112a-112n that may send requests/data to the subscription storage service 104 of the provider network 102 and/or receive requests/data from the subscription storage service 104 of the provider network 102 (e.g., using an application running on the edge device). In embodiments, a user of the client network may send and/or receive requests/data (e.g., a request to store data). Therefore, a user or application of the client network may send a request to store data to the subscription storage service 104. As shown, any number of other clients may use the IoT service 104 with any number of other edge devices in the same or similar manner (e.g., using any number of edge devices 112 of other client network(s) 108). In embodiments, any number of internal clients 114 of the provider network may use the subscription storage service 104 by sending and receiving requests/data in the same or similar manner (e.g., a user or application of the provider network may send a request to store data to the subscription storage service 104).

In some embodiments, a given client network 108 may include one or more management devices. A management device may be any type of computing device that implements a user interface (e.g., graphical user interface (GUI), command line interface, and/or application programming interface (API)) that allows a user (e.g., administrator) to input data (e.g., commands or configuration data such as mandatory values, optional values, predefined criteria for mandatory values, etc.). The subscription storage service 104 may include a management interface that may receive any number of configuration values/instructions from the management device of a client network in order to set/select any of the configurable/variable aspects described herein.

As an example, the management interface may receive the threshold values for one or more of the predefined criteria that are to be used to select a datastore (e.g., based on user input) in order to configure the service for use by the client (in embodiments, the user may select the threshold values from among a list of different predefined values that are available to select from). As another example, the user input may indicate/select the different datastores that are to be selected by the datastore selector (e.g., two or more different datastores that are to be used as target datastores).

In the example embodiment, the subscription storage service 104 includes a datastore selector 116 that may any number of datastore selection criteria 118 in order to select a target datastore and/or a table of the target datastore as the datastore that is to be used to store data of a particular type (e.g., data that has a particular attribute, such as subscription information for a concrete subscription, data of a particular format, size, etc.). In the depicted example, the datastore selector may select between two different target datastores to store data: a non-wildcard store 120 that stores data for concrete types of subscriptions (to store subscription information for concrete subscriptions 122) and a wildcard store 124 that stores data for wildcard types of subscriptions (to store subscription information for wildcard subscriptions 126). Therefore, concrete subscriptions 122 represents subscription information (e.g., data/metadata describing the subscription) for any number of concrete subscriptions for any number of edge devices to any number of topics (e.g., "/a/x"), whereas wildcards subscriptions 126 represents subscription information (e.g., data/metadata describing the subscription) for any number of wildcard subscriptions for any number of edge devices to any number of topics (e.g., "/a/#").

In embodiments, a subscription to a topic may be considered a "concrete type" of subscription to the topic if the subscription is for a particular topic (e.g., a single or exact topic). For example, the characters "/a/x" may indicate a subscription to topic X (e.g., subscription to/a/x), where "a" may represent a first topic level and "x" may be considered a particular topic at a second topic level. In embodiments, a subscription to a topic may be considered a "wildcard type" of subscription to the topic if the subscription is for multiple topics (e.g., subscriptions to all topics of one or more levels). For example, the characters "/a/#" may indicate a subscription to all topics at the second topic level and/or any other topic levels below the second topic level (e.g., subscription to/a/x, /a/y, /a/z, /a/x/x2, /a/x/y2, /a/x/z2, /a/y/x3, /a/y/y3, etc.), where "a" may represent a first topic level and "#" may be considered a wildcard character that represents a subscription to all topics at the second level and/or a subscription to all topics at any number of levels beyond the second level (if any).

For example, concrete subscription 128 may be a record/row in a table (e.g., entry) that includes an identifier(s) for edge device A 112a (e.g., session ID and/or device ID and/or account ID for the device and/or the client that owns the device) and an identifier for the topic that the edge device/application is subscribed to (e.g., /a/x, which identifies topic X). In embodiments, the session ID may be a unique identifier for a session that is established between the edge device and the provider network (e.g., when the edge device establishes a connection with the provider network). In some embodiments, the topic identifier may be used as the primary key. For example, /a/x may be the primary key for the row 128 of a concrete subscription table. Each wildcard subscription 126 of the wildcard store 124 may include the same or similar data to describe each wildcard subscription.

In an embodiment, the non-wildcard store 120 may be a key-value database and the wildcard store 124 may be a trie structure. Therefore, the non-wildcard store 120 implements a data structure for storing a certain type of data ("concrete" type of subscription data or "non-wildcard" type of subscription data), whereas the wildcard store 124 implements a different data structure to for storing a different type of data ("wildcard" type of subscription data). In some embodiments, the wildcard store 124 may be implemented using a different type of storage device(s) that may have a faster data access/storage performance than the non-wildcard store 120. For example, the wildcard store 124 may be an in-memory data store (e.g., implemented using a volatile memory such as RAM, flash, etc.) and the non-wildcard store 120 may be implemented using hard disks or other storage device(s) that provides lower performance at a lower operational cost (e.g., lower cost to operate by the provider network and/or lower prices charged for use by the client).

In various embodiments, any number of different target datastores may be selected/used to store certain types of data, depending on the types of data (e.g., different target datastores may store data using different data structures/databases and/or using different storage devices). For example, a third target datastore may store data using a different type of database and/or different data structure (e.g., an object data store) and/or using a different type of memory/hard disk. Therefore, in various embodiments, a particular datastore may be selected from among any number of different available datastores based on the particular type of data that the client is requesting to store, and the particular datastore may implement a data structure for storing the particular type of data (e.g., the particular datastore and the data structure may be assigned for storing the particular type of data for any number of reasons, such as faster data access, reduced query response time, etc.). In some embodiments, the non-wildcard store (and/or any other data stores) may natively support autoscaling, eventual consistency, and/or strong consistency.

As shown, a database pointer table 130 of the non-wildcard store 120 may be used to store a different pointer entry (e.g., a record/row of the pointer table) for each subscription maintained by the non-wildcard store 120 and the wildcard store 124. For example, the entry 132 includes data that specifies the non-wildcard store 120 as the target datastore that stores subscription information for the subscription of edge device A 112a to topic X (/a/x), as well as data that specifies the topic/topic identifier/ID, the session ID, device ID, account ID, or any other information associated with the edge device or subscription. In contrast, if the subscription information for a particular wildcard subscription (e.g., /a/#) for another edge device is stored in wildcard store 124, then the pointer entry for that wildcard subscription will specify the wildcard store 124 as the target datastore that stores subscription information for the subscription of the other edge device to the wildcard topic (/a/#). Note that in various embodiments, the database pointer table 130 may be stored at any other location at the provider network, such as a different data store/database than the non-wildcard store 120 (e.g., at the wildcard store or other type of storage device/memory).

In embodiments, when a message is published to a particular topic (e.g., via a message broker), the publish-subscribe system may read the non-wildcard store and the wildcard store in order to identify all of the subscribers (e.g., the edge devices) that are subscribed to the particular topic and in order to send the message to the identified subscribers. Therefore, if edge device N 112n publishes a message to topic X, then the message will be sent to edge device A (subscribed to topic/a/x) and to any other edge devices that are subscribed to the topic a/x or to the wildcard topic/a/#.

In some embodiments, the subscription storage service may receive a request to store subscription information for a concrete subscription to a topic for an edge device (e.g., a subscription to topic X for edge device A). The service may determine whether an entry for the subscription to the topic for the edge device exists in the datastore pointer table. If the service determines that the entry does not exist in the datastore pointer table, then the service may: determine (based on the concrete type of the subscription and/or one or more criteria associated with the topic) that the non-wildcard datastore 120 is to be used as the target datastore to store the subscription information for the concrete subscription, add a new entry to the datastore pointer table (the new entry may indicate the non-wildcard datastore 120 as the target datastore and may indicate other information such as the session ID, etc.), and store the subscription information to the non-wildcard datastore 120. In embodiments, if the service instead receives a request to store subscription information for a wildcard subscription, then the service may determine, based on the wildcard type of the subscription and/or one or more criteria associated with the topic) that the wildcard store 124 is to be used as the target datastore (in that case, the service would add a new entry to the pointer table that indicates the wildcard store as the target datastore and would store the subscription information to the wildcard datastore).

In embodiments, one or more criteria that the service takes into account may result in a concrete subscription being stored at the wildcard store instead of the non-wildcard store. For example, if the frequency of subscribe operations for topic X (e.g., transactions per second or TPS) is not below a threshold frequency (e.g., is at or above the threshold frequency or threshold TPS) and/or if the number of edge devices subscribed to topic X is not below a threshold number (e.g., is at or above the threshold number), then the service may determine that the wildcard datastore is to be used as the target datastore to store the subscription information for the concrete subscription. In some embodiments, this may help to prevent overloading the non-wildcard store 120 (e.g., avoiding "hot" partition issues due to storing and/or retrieving too much data within a period of time). In embodiments, this may help to improve database performance by preventing too much subscription data to be stored in one location/partition and/or one particular datastore.

In some cases, an entry for a subscription may already exist in the datastore pointer table. For example, at a later point in time (e.g., after the entry 132 for the concrete subscription for edge device A has already been added), the edge device may send another subscription request for topic X (e.g., with different parameter(s), such as a different version number). If the subscription storage service determines that the entry for the subscription for the edge device already exists in the datastore pointer table, then the service may perform a condition check based at least on the request for the subscription to the topic. If the condition check passes (e.g., the service determines that the target datastore selected by the datastore selector matches the target datastore of the entry and/or the version number indicated by the subscription request to the topic is higher than the version number indicated by the previous subscription request to the topic), then based on the subscription request to the topic, the service may update one or more fields of the entry and update the subscription information at the target datastore (e.g., at the non-wildcard store 120). For example, the service may update the version number from "6" to "7."

In embodiments, if the subscription storage service receives a request to delete subscription information for a particular subscription (e.g., the concrete subscription to topic X for edge device A), then the service may determine whether an entry for the subscription exists in the database pointer table. If so, then the service may identify, based on the entry, the target datastore (e.g., the non-wildcard store 120) and delete the subscription information from the target datastore (e.g., delete the entry 128). However, if the service determines that no entry for the subscription exists in the database pointer table, then the service may delete the subscription information from any/all of the datastores (if the subscription information happens to exist at any of the datastores).

FIG. 2A illustrates an example of a pointer table 202 used for data store selection and routing, according to some embodiments.

In the depicted embodiment, the "datastore" field stores an identifier of the target datastore that is used to store the subscription information for the subscription. As mentioned herein, the datastore selector initially selects the target datastore based on the type of subscription and/or one or more other criteria. In some embodiments, the pointer table may store session to subscribed topic mapping, which may be used to support an unsubscribeAll operation (e.g., unsubscribing all edge devices from the topic).

As shown, the pointer table may include a partition key that includes the account ID and session ID for the edge device, and may include a sort key that includes the topic filter (e.g., the topic identifier, such as/a/x). In embodiments, a composite primary key may include two attributes: the partition key and the sort key. The example pointer table also has a TTL (time to live) field, which may record an amount of time before the record expires (e.g., times out) and is no longer valid. In some embodiments, when a request to delete subscription information is received by the service, the service may clean the data in the target datastore specified by the pointer record (e.g., delete the data from the target datastore) and update the pointer record with a TTL value (e.g., set the TTL value for a particular time or amount of time). In various embodiments, the table may include various other fields/attributes, such as an account ID for the client and/or the edge device, a current version number, a create date for the version number, a create data for the record, and/or a last modified date for the record. In various embodiments, any other suitable table structure may be used to implement the pointer table, with any number of different fields.

FIG. 2B illustrates an example of a subscription table 204, according to some embodiments.

In some embodiments, the subscription table stores the non-wildcard topic to session mapping, which can be leveraged by a topic "match" operation. As shown, the subscription table may include a partition key that includes the account ID and topic filter (e.g., topic ID), and may include a sort key that includes the session ID. In embodiments, a composite primary key may include two attributes: the partition key and the sort key. The example pointer table also has a TTL (time to live) field, which may record an amount of time before the record expires (e.g., times out) and is no longer valid. In various embodiments, the table may include various other fields/attributes, such as an account ID for the client and/or the edge device, an active session ID for the edge device/session, a session version number, subscription version number, session attributes, subscription attributes, a create date for the record, and/or a last modified date for the record. In various embodiments, any other suitable table structure may be used to implement the subscription table, with any number of different fields.

FIG. 2C illustrates an example of a metadata table 206, according to some embodiments.

In some embodiments, the metadata table stores any number of session attributes for a session for an edge device. In embodiments, the session attributes may be returned as the response for a match operation. As shown, the metadata table may include a partition key that includes the account ID and session ID for the edge device. The example pointer table also has a TTL (time to live) field, which may record an amount of time before the record expires (e.g., times out) and is no longer valid. In various embodiments, the table may include various other fields/attributes, such as an account ID for the client and/or the edge device, subscription version number, session attributes, a create date for the record, and/or a last modified date for the record. In various embodiments, any other suitable table structure may be used to implement the metadata table, with any number of different fields.

Figure 3:
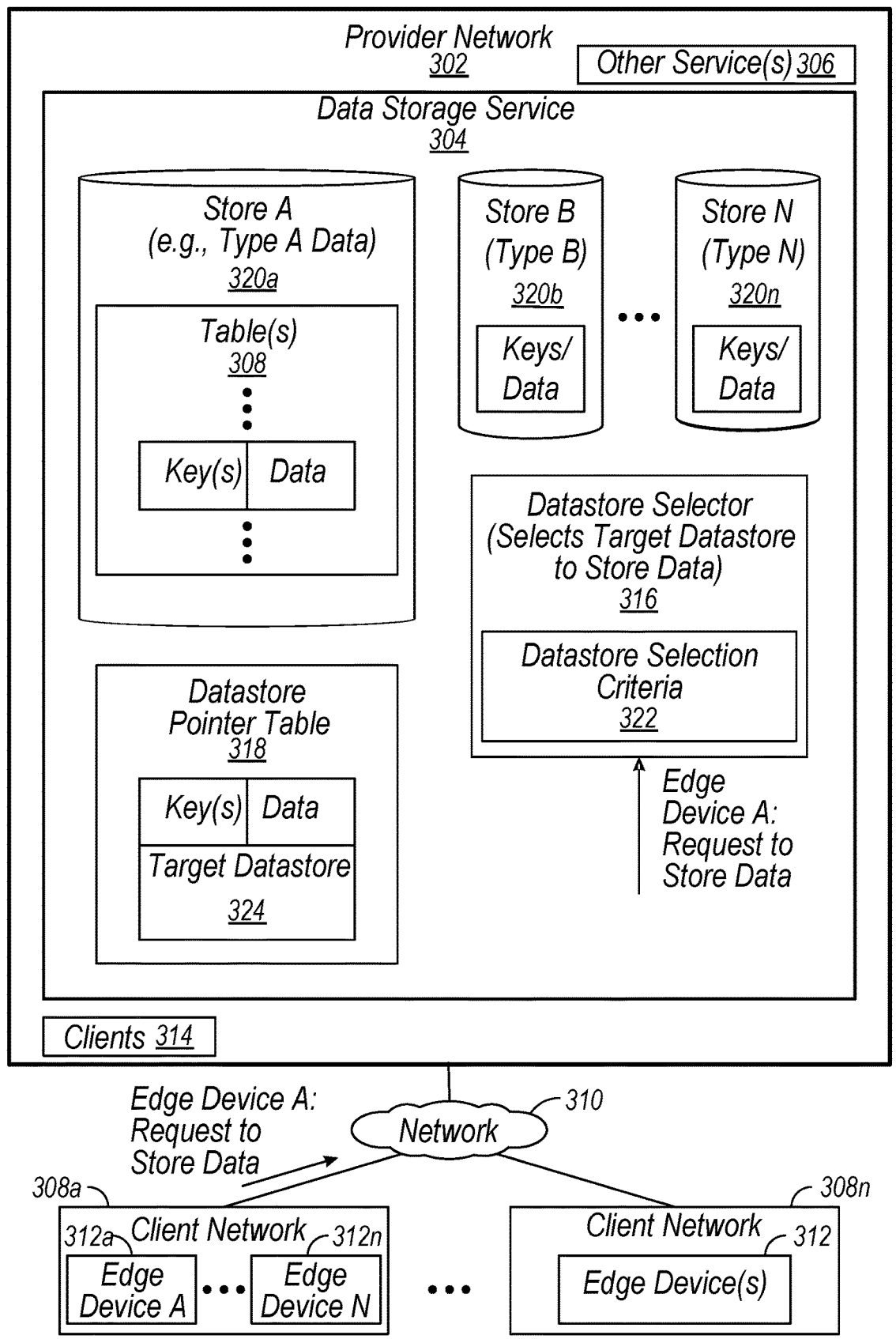
FIG. 3 is a logical block diagram illustrating a system for data store selection and routing using a pointer table.

FIG. 3 is a logical block diagram illustrating a system for data store selection and routing using a pointer table.

In embodiments, the data storage service 304 may perform some or all of the functions described for the subscription storage service 104. For example, the service may receive a request from edge device A to subscribe to topic X (e.g., a request to store subscription data to topic X for edge device A), and the service then stores the subscription data (and datastore pointer data) in response to receiving the request (e.g., by selecting a particular datastore based on the request and/or criteria). Therefore, the subscription data for topic X for edge device A may be considered a particular type of data. However, in embodiments, the data storage service 304 may store any type of data on behalf of a client. Therefore, the data storage service 304 may store a different type of data than subscription data for edge devices.

Any of the components of FIG. 3 may represent the same or similar components (with same/similar functionality) as corresponding components in FIG. 1. For example, the provider network 302 may also include any number of other services 306. Any number of clients may use the service 304 via communication between the service and a remote client network 308 of a client of the service (e.g., via a wide area network 310, such as the internet). For example, a client may own/manage the client network 308*a*, which may include any number of edge devices 312*a*-312*n* that may send requests to store data to the service and/or receive requests/data from the service (e.g., using an application running on the edge device). In embodiments, a user of the client network may send and/or receive requests/data (e.g., a request to store data). Therefore, a user or application of the client network may send a request to store data to the service. As shown, any number of other clients may use the service with any number of other edge devices in the same or similar manner. In embodiments, any number of internal clients 314 of the provider network may use the service by sending and receiving requests/data in the same or similar manner (e.g., a user or application of the provider network may send a request to store data to the service).

Note that in some embodiments, data may be determined (e.g., identified), by the service (e.g., by the datastore selector 316), to be a particular "type" of data if the service determines that the data has one or more particular attributes (e.g., characteristics). For example, the service may determine that data is a particular type of data (e.g., categorized/labeled as type "X" data) if a format of the data matches a particular format and/or if one or more values of the data matches one or more particular values (e.g., one or more particular fields within a request, such as device ID). In embodiments, the service may determine any number of types of data, depending on the identified attribute(s) of data received in a request (type X data, type Y data, etc.).

For example, in the case of subscription data as described above for FIG. 1, the service may determine that received data is a "type" of subscription data for edge device A for topic X (based on identifiers within a subscription request from the edge device that match the device ID, the session ID, and/or the topic ID for the topic that the edge device is subscribed to). If the service determines that a datastore pointer table 318 already has an entry for that type of subscription data (e.g., the device ID, the session ID, and/or the topic ID indicated in the request matches an entry already in the pointer table), then the service may perform a condition check based on the received data (as well as any number of other actions based on the result of the condition check), as described above for FIG. 1. If the service determines that an entry for the type of data subscription data does not exist in the pointer table (e.g., no entry in the pointer table matches the device ID, the session ID, and/or the topic ID), then the service may determine, based on the type of subscription data and one or more criteria, a particular datastore to be used as the target datastore, add a new entry to the pointer table for the new type of subscription data, and store the data to the target datastore, as described above. As shown, in various embodiments, the data storage service may include any number of different target datastores A 320a-store N 320n (each one may store a different type of data, in embodiments).

In embodiments, the data storage service may store any type of data (e.g., not just subscription data), and use the same or similar techniques described for FIG. 1 in order to store data (e.g., selecting a particular datastore to store the data, from among multiple available data stores). The data storage service may receive, from a client (e.g., edge device A), a request to store data. The service may determine, based on an attribute of the data, a type of the data to be stored for the client (e.g., type X). The service may then determine whether an entry for the type of the data to be stored for the client exists in a datastore pointer table. If the service determines that the entry for the type of the data to be stored for the client does not exist in the datastore pointer table, then the service may: determine, based on the type of the data and one or more criteria 322 associated with the type of the data, that a first datastore (e.g., a particular datastore from among multiple different available data stores) is to be used as a target datastore to store the data, add a new entry to the datastore pointer table, where the entry indicates the first datastore as the target datastore 324 for the type of the data to be stored for the client, and store the data to the first data store (e.g., table 308 of store A 320a).

In the example embodiment, the entry may also include one or more keys and may include at least a portion of the data to be stored and/or metadata. For example, the one or more keys may identify the type of the data (e.g., a value/ID unique to the type of the data). As shown, the actual data may be stored in an entry in table 308 of store A 320a. The entry may include one or more keys that identify the type of data (e.g., a value/ID unique to the type of the data). Data may be stored in the same/similar way in any of the other data stores 320b-320n (e.g., storing the keys and/or the data). In some embodiments, the type of the data may be a sub-type of a larger type/group of data. For example, in the case of the subscription data above, the larger type/group of data may be devices subscribed to topic X, whereas the type of the data is identified based on the session ID for the edge device as well as the topic name (e.g., a composite key).

As mentioned, any number of target data stores may be used, in embodiments. For example, the service may receive, from the client, a request to store additional data. The service may determine, based on an attribute of the additional data, a second type of the additional data to be stored for the client (e.g., type Y). The service may then determine whether an entry for the second type of the additional data to be stored for the client exists in the datastore pointer table. If the service determines that the entry for the second type of the additional data to be stored for the client does not exist in the datastore pointer table, then the service may: determine, based on the second type of the additional data and one or more criteria associated with the second type of the additional data, that a second datastore (e.g., another particular datastore from among multiple different available data stores) is to be used as a target datastore to store the additional data, add a new entry to the datastore pointer table, where the entry indicates the second datastore as the target datastore for the second type of the additional data to be stored for the client, and store the additional data to the second data store. The above process may be used to store other data to a third data store, to store other data to a fourth data store, etc.

In embodiments, one or more criteria that the service takes into account may result in data being stored in a second target datastore instead of a first target datastore. For example, if the frequency of requests to store data of type X is not below a threshold frequency (e.g., is at or above the threshold frequency) and/or if the number of edge devices/users that data of type X is stored for is not below a threshold number (e.g., is at or above the threshold number), then the service may determine that the second target datastore is to be used as the target datastore to store data instead of the first target datastore (even though the same type of data for previous request was stored in the first target datastore). This may help to prevent overloading a particular datastore (e.g., avoiding "hot" partition issues due to storing and/or retrieving too much data within a period of time).

In some cases, an entry for the type of data may already exist in the datastore pointer table. If the service determines that the entry for the type of data already exists in the datastore pointer table, then the service may perform a condition check based at least on the request for storing the data. If the condition check passes (e.g., the service determines that the target datastore selected by the datastore selector matches the target data store of the entry and/or metadata indicated by the request to store the type of data is different than metadata indicated by the previous request to store the type of data), then based on the request to store the data, the service may update one or more fields of the entry and update the data at the target datastore based on the new data (e.g., update the data or associated metadata at the target datastore).

In embodiments, if the service receives a request to delete a type of data, then the service may determine whether an entry for the type of data exists in the database pointer table. If so, then the service may identify, based on the entry, the target datastore that stores the data and delete the data from the target datastore (e.g., delete the entry xxx). In embodiments, the service may also set a TTL for the entry (the entry may be automatically deleted/removed after the time indicated by the TTL has passed/elapsed). However, if the service determines that no entry for the type of the data exists in the database pointer table, then the service may delete the data from any/all of the datastores (if the data happens to exist at any of the datastores).

In embodiments, the request to store data may be received from a client of the provider network (e.g., a user or application of the provider network) or the request to store data may be received from a user or application of a remote network. In some embodiments, an attribute of the data may be a format of the data, where the format is one of different formats of data that are used by different datastores of the provider network. As mentioned above, in some embodiments, the one or more criteria may be: a frequency of write operations (or TPS) to the first datastore for the type of data is below a threshold frequency (or below a particular TPS value).

Figure 4:
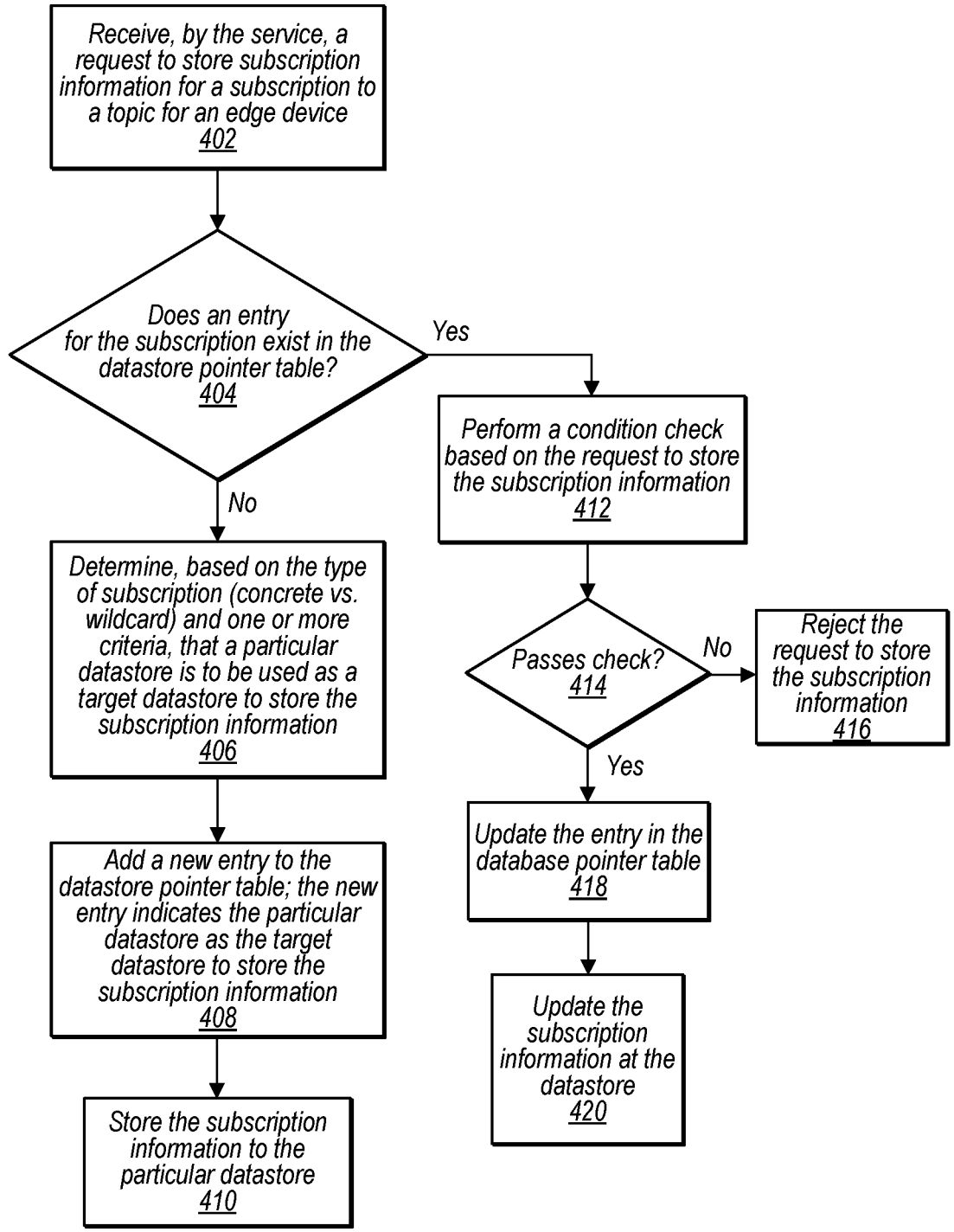
FIG. 4 is a high-level flowchart illustrating various methods and techniques for data store selection and routing using a pointer table, according to some embodiments.

FIG. 4 is a high-level flowchart illustrating various methods and techniques for data store selection and routing using a pointer table, according to some embodiments. In various embodiments, any of the functionality described for any portions of the flowcharts 4-5 may be performed by any of the components of FIGS. 1-3 and/or 6.

Figure 5:
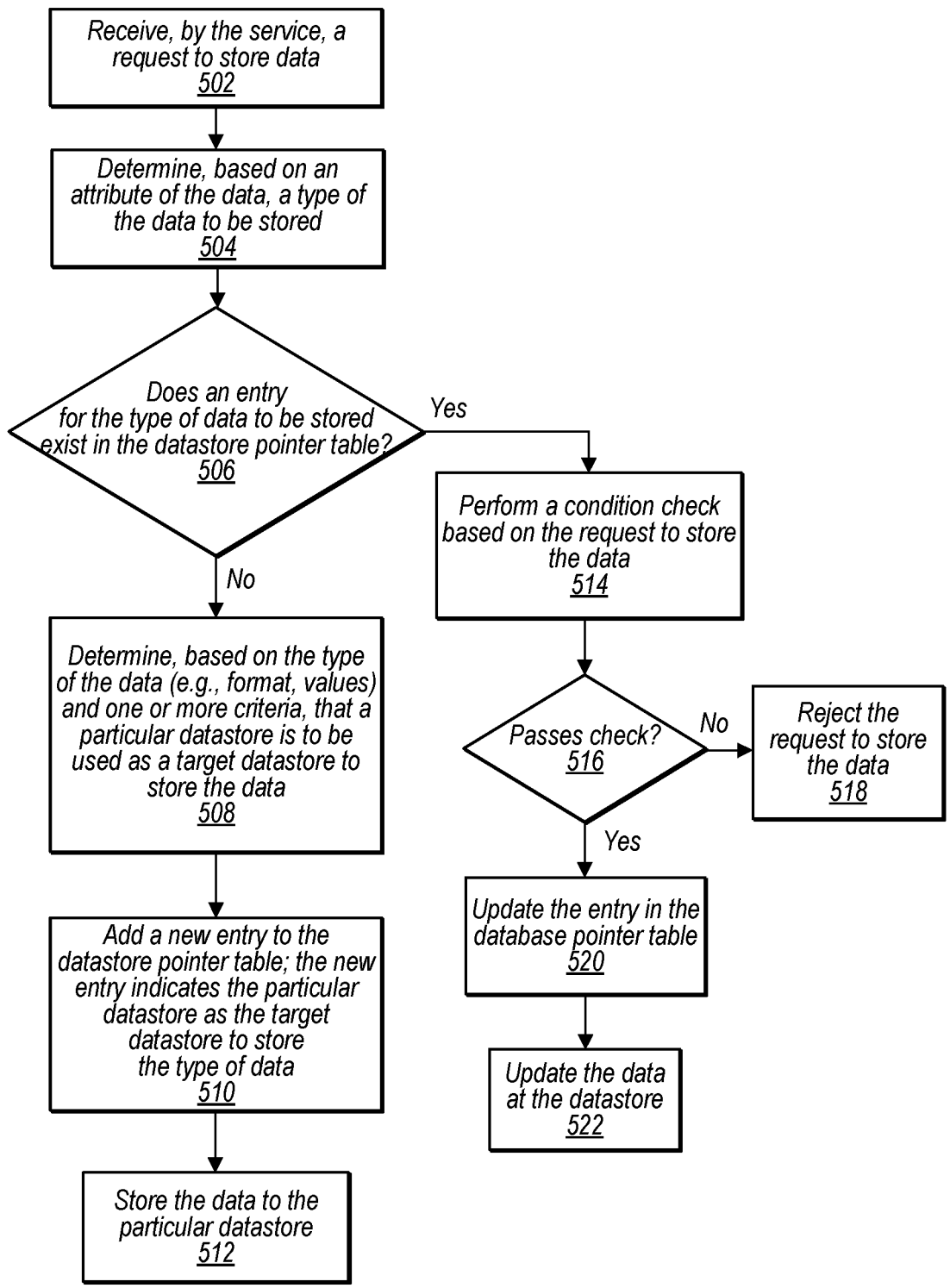
FIG. 5 is a high-level flowchart illustrating various methods and techniques to monitor for data store selection and routing using a pointer table, according to some embodiments.

These techniques, as well as the techniques discussed with regard to FIG. 5, may be implemented using components or systems as described above with regard to FIGS. 1-3, as well as other types of components or systems, and thus the following discussion is not intended to be limiting as to the other types of systems that may implement the described techniques. For example, any of the techniques may be implemented by one or more services of a provider network and/or a local service/application of a client network.

At block 402, the subscription storage service receives a request to store subscription information for a subscription to a topic for an edge device. At block 404, the service determines whether an entry for the subscription exists in the datastore pointer table. If not, then at block 406, the service determines, based on the type of subscription (e.g., concrete vs. wildcard) and/or one or more criteria, that a particular datastore is to be used as a target datastore to store the subscription information. At block 408, the service adds a new entry to the datastore pointer table; the new entry indicates the particular datastore as the target datastore to store the subscription information. At block 410, the service stores the subscription information to the particular datastore.

Returning to block 404, if the service determines that an entry for the subscription exists in the datastore pointer table, then at block 412, the service performs a condition check based on the request to store the subscription information. At block 414, the service determines whether the condition check passed. If not, then at block 416, the service rejects the request to store the subscription information. If so, then at block 418, the service updates the entry in the database pointer table. At block 420, the service updates the subscription information at the datastore.

FIG. 5 is a high-level flowchart illustrating various methods and techniques to monitor for data store selection and routing using a pointer table, according to some embodiments.

At block 502, the storage service receives a request to store data. At block 504, the service determines, based on an attribute(s) of the data, a type of the data to be stored. At block 506, the service determines whether an entry for the type of data to be stored exists in the datastore pointer table. If not, then at block 508, the service determines, based on the type of the data and/or one or more criteria, that a particular datastore is to be used as a target datastore to store the data. At block 510, the service adds a new entry to the datastore pointer table; the new entry indicates the particular datastore as the target datastore to store the type of data. At block 512, the service stores the data to the particular datastore.

Returning to block 506, if the service determines that an entry for the type of data to be stored exists in the datastore pointer table, then at block 514, the service performs a condition check based on the request to store the data. At block 516, the service determines whether the condition check passed. If not, then at block 518, the service rejects the request to store the data. If so, then at block 520, the service updates the entry in the database pointer table. At block 522, the service updates the data at the datastore (e.g., stores the data and/or updates existing data).

The methods described herein may in various embodiments be implemented by any combination of hardware and software. For example, in one embodiment, the methods may be implemented by a computer system (e.g., a computer system as in FIG. 6) that includes one or more processors executing program instructions stored on a computer-readable storage medium coupled to the processors. The program instructions may implement the functionality described herein (e.g., the functionality of the subscription storage service and any other components that implement the techniques described herein). The various methods as illustrated in the figures and described herein represent example embodiments of methods. The order of any method may be changed, and various elements may be added, reordered, combined, omitted, modified, etc.

Figure 6:
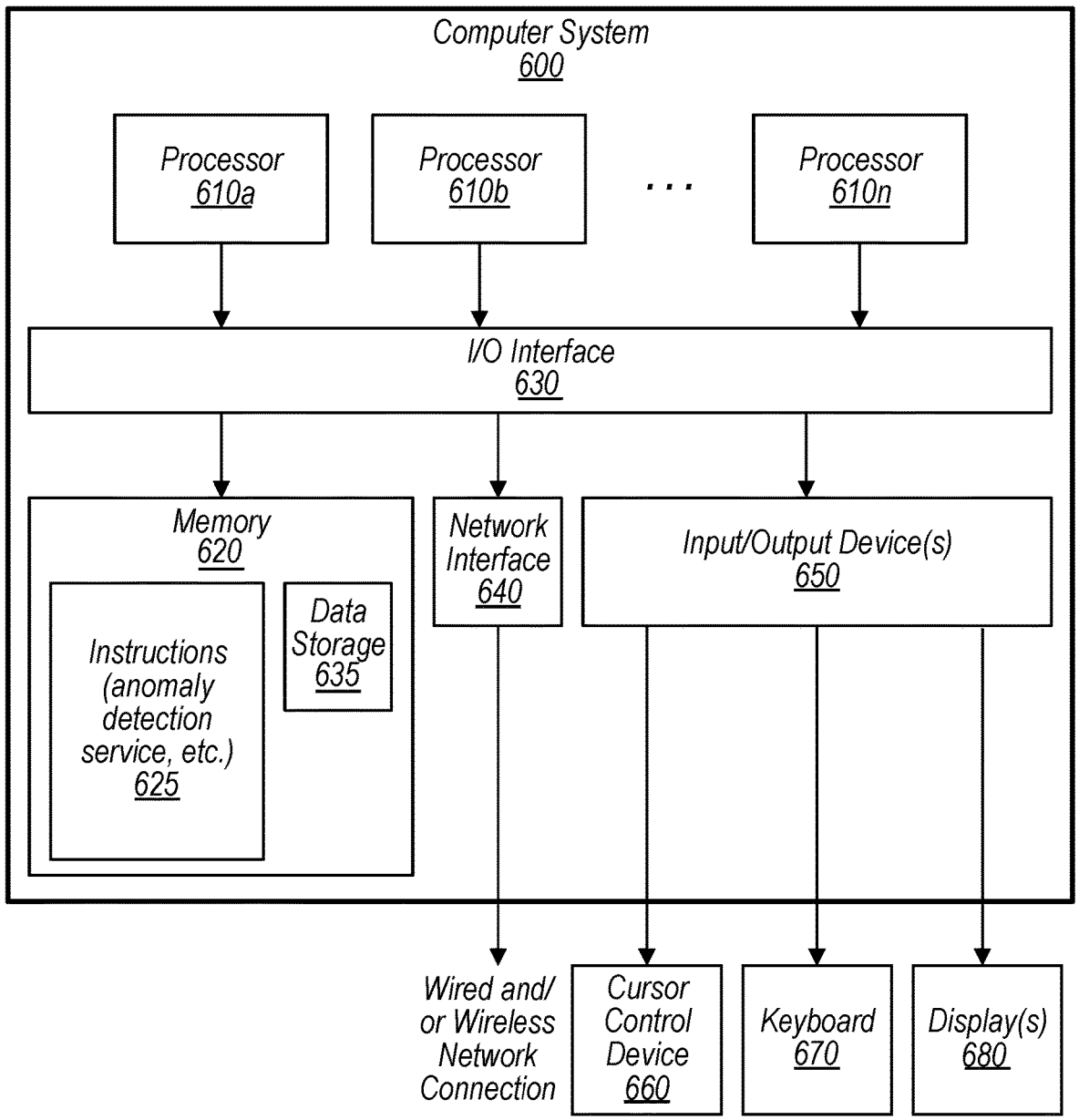
FIG. 6 is a block diagram illustrating an example computing system, according to some embodiments.

Embodiments to implement data store selection and routing using a pointer table, which may interact with various other systems or devices. One such computer system is illustrated by FIG. 6. In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. Display(s) may include standard computer monitor(s) and/or other display systems, technologies or devices, in one embodiment. In some embodiments, it is contemplated that embodiments may be implemented using a single instance of computer system 600, while in other embodiments multiple such systems, or multiple nodes making up computer system 600, may host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions, in one embodiment. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 620 may store program instructions 625 and/or data accessible by processor 610, in one embodiment. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the subscription storage service, other services, and any other components) are shown stored within system memory 620 as program instructions 625 and data storage 635, respectively. In other embodiments, program instructions and/or data may be received, sent or stored upon different types of computer-accessible media or on similar media separate from system memory 620 or computer system 600. A computer-accessible medium may include non-transitory storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640, in one embodiment.

In one embodiment, I/O interface 630 may be coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor 610.

Network interface 640 may allow data to be exchanged between computer system 600 and other devices attached to a network, such as other computer systems, or between nodes of computer system 600, in one embodiment. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or retrieving data by one or more computer system 600, in one embodiment. Multiple input/output devices 650 may be present in computer system 600 or may be distributed on various nodes of computer system 600, in one embodiment. In some embodiments, similar input/output devices may be separate from computer system 600 and may interact with one or more nodes of computer system 600 through a wired or wireless connection, such as over network interface 640.

As shown in FIG. 6, memory 620 may include program instructions 625 that implement the various embodiments of the systems as described herein, and data store 635, comprising various data accessible by program instructions 625, in one embodiment. In one embodiment, program instructions 625 may include software elements of embodiments as described herein and as illustrated in the Figures. Data storage 635 may include data that may be used in embodiments (e.g., data, entries, subscription data, etc.). In other embodiments, other or different software elements and data may be included.

Those skilled in the art will appreciate that computer system 600 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 600 may be transmitted to computer system 600 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    one or more processors and one or more memories, wherein the one or more memories have stored thereon instructions, which when executed by the one or more processors, cause the one or more processors to implement subscription storage service for a plurality of clients of a provider network, wherein the subscription storage service is configured to, for individual clients of the subscription storage service:
        receive a request to store subscription information for a subscription to a topic for an edge device, wherein the subscription is for a concrete type of subscription to the topic, and wherein the subscription storage service manages information for concrete types of subscriptions and wildcard types of subscriptions according to a publish-subscribe protocol;
        determine whether an entry for the subscription to the topic for the edge device exists in a datastore pointer table; and
        in response to a determination that the entry for the subscription to the topic for the edge device does not exist in the datastore pointer table:
            determine, based on the concrete type of the subscription and one or more criteria associated with the topic, that a first datastore is to be used as a target datastore to store the subscription information that indicates the subscription to the topic for the edge device, wherein the first datastore is associated with concrete topics and a second datastore is associated with wildcard topics;
            add a new entry to the datastore pointer table, wherein the new entry indicates the first datastore as the target datastore to store the subscription information; and
            store the subscription information to the first datastore.

2. The system as recited in claim 1, wherein the subscription storage service is further configured to, subsequent to reception of a request to store other subscription information for another subscription to another topic for the edge device:
    in response to a determination that another entry for the other subscription for the edge device exists in the datastore pointer table:
        perform another condition check based at least on the request for the subscription to the other topic;
        in response to passage of the other condition check:
            based on the request for the subscription to the other topic:
                update one or more fields of the other entry; and
                update the other subscription information at the first datastore.

3. The system as recited in claim 1, wherein the subscription storage service is further configured to:
    receive a request to delete the subscription information;
    determine that no entry for a subscription to the topic for the edge device exists in the datastore pointer table; and
    in response to the determination that no entry for a subscription to the topic for the edge device exists in the datastore pointer table:
        delete the subscription information from one or more of the first datastore and a second datastore.

4. The system as recited in claim 1, wherein the subscription storage service is further configured to:
    receive a request to store other subscription information for a subscription to a second topic for the edge device, wherein the request is for a concrete type of subscription to the second topic;
    determine whether an entry for the second subscription for the edge device exists in the datastore pointer table;
    in response to a determination that the entry for the second subscription for the edge device does not exist in the datastore pointer table:
        determine, based on the concrete type of the second subscription and the one or more criteria associated with the topic, that the second datastore is to be used as a target datastore to store the other subscription information that indicates the subscription to the second topic for the edge device;
        add an additional entry to the datastore pointer table, wherein the additional entry indicates the second datastore as the target datastore to store the other subscription information; and
        store the other subscription information to the second datastore.

5. The system as recited in claim 1, wherein the one or more criteria associated with the topic comprises one or more of:
    a frequency of subscribe operations for the topic is below a threshold frequency, or
    a number of edge devices subscribed to the topic is below a threshold number.

6. A method, comprising:
performing, by one or more computing devices of a provider network:
receiving, from an edge device, a request to store data;
determining, based on an attribute of the data, a type of the data to be stored for the edge device;
determining whether an entry that identifies the edge device and the type of the data to be stored for the edge device exists in a datastore pointer table; and
in response to determining that the entry that identifies the edge device and the type of the data to be stored for the edge device does not exist in the datastore pointer table:
determining, based on the type of the data to be stored for the edge device and one or more criteria associated with the type of the data, that a first datastore is to be used as a target datastore to store the data, wherein the target datastore also stores data of the same type for one or more other edge devices based on previous requests to store data, and wherein the first datastore is selected from among different datastores based on the type of the data, and wherein the first datastore implements a data structure for storing the type of the data;
adding the entry to the datastore pointer table, wherein the entry indicates the first datastore as the target datastore for the type of the data to be stored for the edge device; and
storing the data to the first datastore.

7. The method as recited in claim 6, further comprising:
receiving, from the edge device, a request to store additional data;
determining, based on an attribute of the additional data, a type of the additional data to be stored for the edge device;
determining whether an entry for the type of the additional data to be stored for the edge device exists in a datastore pointer table;
in response to determining that the entry for the type of the additional data to be stored for the edge device exists in the datastore pointer table:
performing a condition check based at least on the request to store the additional data;
in response to passing the condition check:
based on the request to store additional data:
updating one or more fields of the entry; and
updating the data at the first datastore based on the additional data.

8. The method as recited in claim 6, further comprising:
receiving, from the edge device, a request to delete the data;
identify, based on the entry, the first datastore as the target datastore; and
delete the data from the first datastore.

9. The method as recited in claim 6, further comprising:
receiving, from the edge device, a request to store additional data;
determining, based on an attribute of the additional data, a second type of the additional data to be stored for the edge device;
determining whether an entry for the second type of the additional data to be stored for the edge device exists in the datastore pointer table;
in response to determining that the entry for the second type of the additional data to be stored for the edge device does not exist in the datastore pointer table:
determining, based on the second type of the additional data and one or more criteria, that a second datastore is to be used as a target datastore to store the additional data, wherein the second datastore is selected from among the different datastores based on the second type of the additional data, and wherein the second datastore implements a different data structure for storing the second type of the additional data;
adding a new entry to the datastore pointer table, wherein the new entry indicates the second datastore as the target datastore for the second type of the additional data to be stored for the edge device; and
storing the additional data to the second datastore.

10. The method as recited in claim 9, further comprising:
receiving, from the edge device, a request to store other data;
determining, based on an attribute of the other data, a third type of the other data to be stored for the edge device;
determining whether an entry for the third type of the other data to be stored for the edge device exists in the datastore pointer table;
in response to determining that the entry for the third type of the other data to be stored for the edge device does not exist in the datastore pointer table:
determining, based on the third type of the other data and one or more criteria, that a third datastore is to be used as a target datastore to store the other data, wherein the third datastore is selected from among the different datastores based on the third type of the other data, and wherein the third datastore implements another data structure for storing the third type of the other data;
adding another new entry to the datastore pointer table, wherein the other new entry indicates the third datastore as the target datastore for the third type of the other data to be stored for the edge device; and
storing the other data to the third datastore.

11. The method as recited in claim 6, wherein receiving, from the edge device, a request to store data comprises:
receiving, from a user or application of a remote network, the request to store data.

12. The method as recited in claim 6, wherein the attribute of the data comprises a format of the data, wherein the format is one of a plurality of formats of data that are used by the different datastores of the provider network.

13. The method as recited in claim 6, wherein the one or more criteria associated with the type of the data comprises:
a frequency of write operations to the first datastore for the type of data is below a threshold frequency.

14. The method as recited in claim 6, wherein the request to store data comprises a request to store subscription information that indicates a subscription to a topic for the edge device.

15. One or more non-transitory computer-accessible storage media storing program instructions that when executed on or across one or more processors cause the one or more processors to:
receive, from an edge device, a message that comprises data;
determine, based on an attribute of the data, a type of the data to be stored for the edge device;
determine whether an entry that identifies the edge device and the type of the data to be stored for the edge device exists in a datastore pointer table;

in response to a determination that the entry that identifies the edge device and the type of the data to be stored for the edge device does not exist in the datastore pointer table:
    determine, based on the type of the data to be stored for the edge device and one or more criteria associated with the type of the data, that a first datastore is to be used as a target datastore to store the data, wherein the target datastore also stores data of the same type for one or more other edge devices based on previous messages, and wherein the first datastore is selected from among different datastores based on the type of the data, and wherein the first datastore implements a data structure for storing the type of the data;
    adding the entry to the datastore pointer table, wherein the entry indicates the first datastore as the target datastore for the type of the data to be stored for the edge device; and
    storing the data to the first datastore.

16. The one or more storage media as recited in claim 15, wherein the program instructions when executed on or across the one or more processors further cause the one or more processors to:
    receive, from the edge device, another message that comprises additional data;
    determine, based on an attribute of the additional data, a type of the additional data to be stored for the edge device;
    determine whether an entry for the type of the additional data to be stored for the edge device exists in a datastore pointer table;
    in response to a determination that the entry for the type of the additional data to be stored for the edge device exists in the datastore pointer table:
        perform a condition check based at least on the additional data;
        in response to passage of the condition check:
            based on the message:
                update one or more fields of the entry; and
                update the data at the first datastore based on the additional data.

17. The one or more storage media as recited in claim 16, wherein the program instructions when executed on or across the one or more processors further cause the one or more processors to:
    receiving, from the edge device, another message that indicates the data;
    determining that no entry for the type of the data to be stored for the edge device exists in the datastore pointer table;
    in response to determining that no entry for the type of the data to be stored for the edge device exists in the datastore pointer table exists in the datastore pointer table:
        deleting the data from one or more of the first datastore and a second datastore.

18. The one or more storage media as recited in claim 15, wherein the program instructions when executed on or across the one or more processors further cause the one or more processors to:
    receive, from the edge device, another message that comprises additional data;
    determine, based on an attribute of the additional data, a second type of the additional data to be stored for the edge device;
    determine whether an entry for the second type of the additional data to be stored for the edge device exists in the datastore pointer table;
    in response to a determination that the entry for the second type of the additional data to be stored for the edge device does not exist in the datastore pointer table:
        determine, based on the second type of the additional data and one or more criteria associated with the second type of the additional data, that a second datastore is to be used as a target datastore to store the additional data, wherein the second datastore is selected from among the different datastores based on the second type of the additional data, and wherein the second datastore implements a different data structure for storing the second type of the additional data;
        add a new entry to the datastore pointer table, wherein the new entry indicates the second datastore as the target datastore for the second type of the additional data to be stored for the edge device; and
        store the additional data to the second datastore.

19. The one or more storage media as recited in claim 15, wherein the one or more criteria associated with the second type of the data comprises a frequency of write operations to the first datastore for the second type of data is below a threshold frequency, and wherein to determine that the second datastore is to be used as a target datastore to store the additional data, the program instructions when executed on or across the one or more processors further cause the one or more processors to:
    determine that the frequency of write operations to the first datastore for the second type of data is below the threshold frequency.

20. The one or more storage media as recited in claim 15, wherein the message comprises a request to store subscription information that indicates a subscription to a topic for the edge device.

* * * * *